United States Patent
Samoylov et al.

(10) Patent No.: US 12,507,667 B2
(45) Date of Patent: Dec. 30, 2025

(54) TILE CLEANING SYSTEM AND ASSOCIATED METHOD

(71) Applicant: Georgia Tech Research Corporation, Atlanta, GA (US)

(72) Inventors: Alexander Samoylov, Atlanta, GA (US); Francisco Valdes Catillo, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 13 days.

(21) Appl. No.: 18/597,178

(22) Filed: Mar. 6, 2024

(65) Prior Publication Data

US 2024/0298603 A1    Sep. 12, 2024

Related U.S. Application Data

(60) Provisional application No. 63/450,284, filed on Mar. 6, 2023.

(51) Int. Cl.
*A01K 1/01*     (2006.01)
*A01K 1/015*    (2006.01)

(52) U.S. Cl.
CPC .......... *A01K 1/0128* (2013.01); *A01K 1/0151* (2013.01)

(58) Field of Classification Search
CPC .......................... A01K 1/0128; A01K 1/0151
See application file for complete search history.

(56) References Cited

U.S. PATENT DOCUMENTS

| | | | | |
|---|---|---|---|---|
| 1,800,814 | A | * | 4/1931 | Boldt ................... A01K 1/0128 198/733 |
| 2,513,706 | A | * | 7/1950 | Baehr ................... A01K 1/0128 198/733 |
| 2022/0117454 | A1 | * | 4/2022 | Rakowski .............. B65G 19/28 |

FOREIGN PATENT DOCUMENTS

CA    2197269 C  *  1/1999  .......... A01K 1/0151

* cited by examiner

Primary Examiner — Monica L Perry
(74) Attorney, Agent, or Firm — Blank Rome LLP

(57) ABSTRACT

Tile cleaning systems and associated methods are disclosed. The tile cleaning system can include a plurality of tiles and a plurality of movers. The movers can move the tiles along a floor in a circuit while the plurality of tiles directly contact the floor. The tile cleaning system can include a cleaner they can clean the tiles in the circuit.

20 Claims, 4 Drawing Sheets

TILE CLEANING SYSTEM AND ASSOCIATED METHOD

CROSS REFERENCE TO RELATED APPLICATIONS

This application claims priority to U.S. Provisional Patent Application No. 63/450,284, filed on Mar. 6, 2023, the entirety of which is hereby incorporated herein by reference.

TECHNICAL FIELD

This disclosure is generally directed to the field of tile cleaning and includes for example systems for cleaning a plurality of tiles that support livestock.

BACKGROUND

Floor surfaces that support livestock can accumulate waste such as excrement and food. This waste can be unsanitary and harmful to the livestock. Cleaning existing livestock floor surfaces can be difficult due to, for example, interference from the livestock using the floor. Cleaning can also be costly due to, for example, downtime caused by removing the livestock during cleaning. Some floor surfaces use woodchips or other absorbent material to absorb waste. But such solutions only delay the negative impacts caused by the waste and are themselves costly and difficult to clean.

SUMMARY

The inventors recognized that there exists a need for a system that can clean floor surfaces below livestock regularly, thoroughly, and inexpensively. Accordingly, one general aspect of this invention is directed to a tile cleaning system. The tile cleaning system can include a plurality of tiles and a plurality of movers that can move the plurality of tiles along a floor in a circuit while the plurality of tiles directly contact the floor. The tile cleaning system can also include a cleaner configured to clean the plurality of tiles in the circuit.

Implementations may include one or more of the following features. The tile cleaning system may include an enclosure above the plurality of tiles. The tile cleaning system may include a cover above the plurality of tiles and within a bottom of the enclosure. The cover covers an entirety of a bottom area of the enclosure. The cover is configured to be stationary when the plurality of tiles moves along the floor in the circuit. The cover may include openings that extend entirely through the cover and open to the plurality of tiles below the cover. Adjacent tiles of the plurality of tiles are configured to interlock together. Each tile of the plurality of tiles may include: an upper portion; a lower portion; and an accumulation area defined in a space between the upper portion and the lower portion. The upper portion defines openings that extend entirely through the upper portion and open into the accumulation area. The cleaner may include a first body that corresponds to the openings of the upper portion of the tile. The first body is configured to force waste through the openings of the upper portion of the tile. The cleaner may include a second body that corresponds to the accumulation area. The second body is configured to force waste through the accumulation area and out of the tile to clean the tile. The plurality of movers may include: a first mover configured to move a first row of tiles of the plurality of tiles towards a second end of the circuit; and a second mover configured to move the plurality of tiles from the first row of tiles to a second row of tiles of the plurality of tiles. The second mover is configured to move the plurality of tiles at a rate that is faster than a rate that the first mover is configured to move the plurality of tiles. The first mover is configured to move the plurality of tiles alternately with the second mover. The plurality of movers may include: a third mover configured to move the second row of tiles towards a first end of the circuit; and a fourth mover configured to move the plurality of tiles from the second row of tiles to the first row of tiles. The fourth mover is configured to move the plurality of tiles at rate that is faster than a rate that the third mover is configured to move the plurality of tiles. The third mover is configured to move the plurality of tiles alternately with the fourth mover. At least one of the first mover and the third mover are configured to move the plurality of tiles at a rate of between 0.064-10.8 in/min. The first mover and the third mover are configured to move the plurality of tiles at a same rate.

Another general aspect of this invention is directed to a method of cleaning a plurality of tiles. The method of cleaning includes moving at least one tile of a plurality of tiles, with a first mover, from a first row of the plurality of tiles into a cleaner. The method of cleaning also includes cleaning the at least one tile in the cleaner. The method of cleaning also includes moving the at least one tile, with a second mover, from the first row to a second row of the plurality of tiles adjacent to the first row. The method of cleaning also includes moving the at least one tile, with a third mover, in the second row.

Implementations may include one or more of the following features. Cleaning the at least one tile with the cleaner may include cleaning the at least one tile vertically through openings in an upper portion of the at least one tile. Cleaning the at least one tile with the cleaner may include cleaning the at least one tile horizontally through an accumulation area of the at least one tile. The method of cleaning may include moving the at least one tile, with a fourth pusher, from the second row to the first row.

Various additional features and advantages of this invention will become apparent to those of ordinary skill in the art upon review of the following detailed description of the illustrative embodiments taken in conjunction with the accompanying drawings.

BRIEF DESCRIPTION OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings.

DETAILED DESCRIPTION

Some aspects of this invention are directed to tile cleaning systems and associated methods. Tiles according to some aspects of this invention can be used, for example, as flooring for livestock such as for example hens, chickens, duck, turkey, among other possibilities. The tile cleaning systems and related methods can be utilized for other uses outside of animal husbandry. The tile cleaning systems and associated methods provide for timely livestock waste removal from livestock enclosures by using tiles that can accumulate and remove waste from the livestock enclosures. The tiles can include openings that can provide a safe and dry environment by facilitating waste accumulation in an accumulation region of the tile below the openings. Tiles according to aspects of this invention can maintain a relatively clear contact surface for the livestock to reside on. The tiles can also push and move other tiles directly along the floor when moved by movers of the tile cleaning system. The tiles can slide along the floor of the livestock enclosure from one side to the other at a relatively slow rate of speed so as not to disturb livestock residing on top of the tiles.

Waste accumulated with and/or on the tiles can be removed from the tiles once each tile reaches a side of the enclosure and enters a cleaner of the tile cleaning system. The tiles can be driven in a circuit 154, or in groups of circuits, around the enclosure by a set of movers located at one or more sides of the enclosures. The cleaner of the tile cleaning system can also be located at sides of the enclosures and can remove the accumulated waste from the tiles.

The tiles can slide directly on the floor of the enclosures without any separate supports, which can allow for human and equipment to operate directly on the tiles since the tiles can accommodate significant loads exerted by humans and traffic equipment.

The rate that the tiles move within the enclosure can be customized based on any number of parameters including for example the size and age of the livestock that reside on the tiles, rates of accumulation of the waste on the tiles, parameters related to livestock behavior and well-being, among other possibilities. Those and other aspects of the tile cleaning system and associated methods of this disclosure are shown in FIGS. 1-7 and are described in greater detail as follows.

Figure 1:
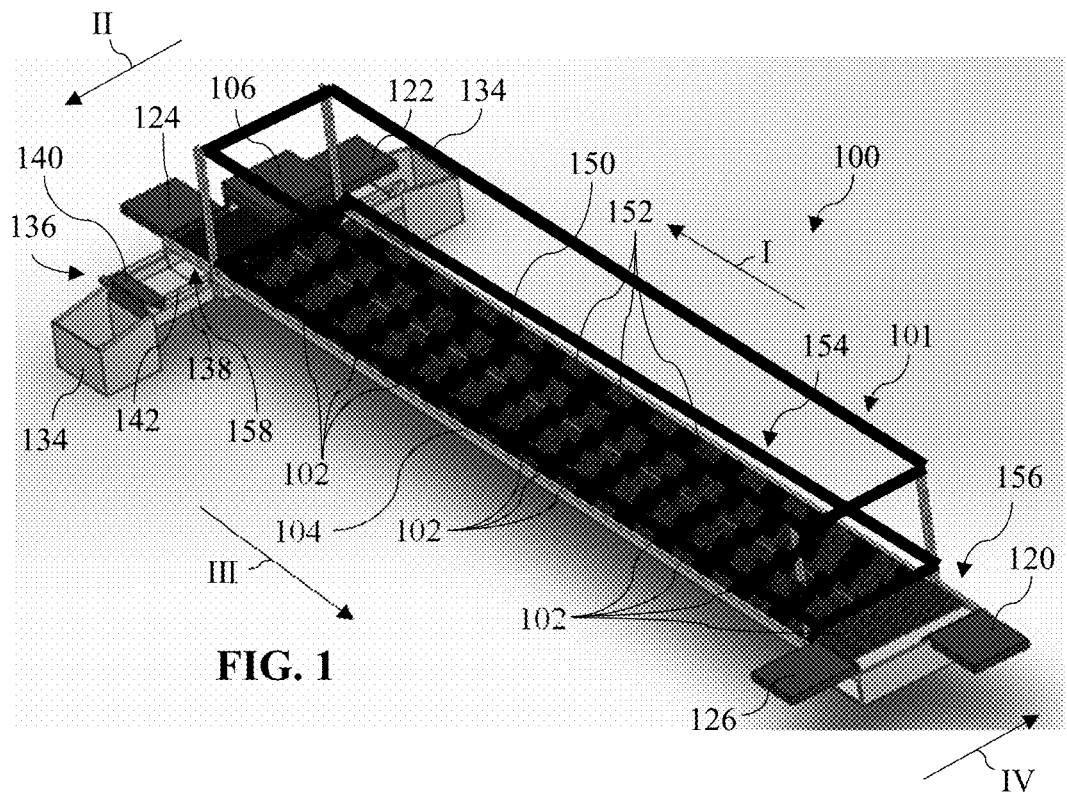
FIG. 1 shows an example tile cleaning system.

FIG. 1 shows a schematic view of a tile cleaning system 100 according to some aspects of the invention. The tile cleaning system 100 includes a plurality of tiles 102, which can be arranged in adjacent rows (e.g., first and second rows). The tile cleaning system 100 can include a plurality of movers that can move the tiles 102 along a floor 104 in the circuit 154. The movers can move the tiles 102 by pushing and/or pulling the tiles directly on the floor 104. Though in embodiments the tiles 102 can themselves include features that can reduce friction between the tiles 102 and the floor 104 (e.g., feet, bearings, wheels, among other possibilities), the movers of the tile cleaning system 100 can move the tiles 102 without any additional structure of the movers intervening between the tiles 102 and the floor 104. That is, in embodiments, the tiles 102 can be provided directly on the floor 104 while being moved along the floor 104 in the circuit 154 by the plurality of movers located at ends of the circuit 154. For example, the movers of the tile cleaning system 100 can move the tiles 102 without any conveyor or roller system between the tiles 102 and the floor 104. That can be advantageous for example by reducing the overall cost of the system and/or by improving the load capability of the tiles 102 and the floor 104. The tile cleaning system 100 can include a cleaner 106. The cleaner 106 can be any implement or machine capable of cleaning the tiles 102 either automatically or together with an operator.

The tile cleaning system 100 can include and/or be implemented with enclosures for livestock. For example, the tile cleaning system 100 can include or be used with an enclosure 101 (e.g., a pen) capable of containing livestock, as shown schematically in FIG. 1. The enclosure 101 can surround an area above the tiles 102 between movers that are disposed at opposite ends of the tiles 102.

In embodiments, the tile cleaning system 100 can include a cover 150 arranged above the tiles 102. For example, the cover 150 can be arranged within a bottom of the enclosure 101 and can cover an entirety of the bottom area of the enclosure 101. The cover 150 can be stationary and the tiles 102 can move below the cover 150, as described later. The cover 150 can include openings 152 that can extend entirely through the cover 150 and open to the tiles 102 below the cover 150. The cover 150 can support livestock thereon, and waste associated with the livestock (e.g., excrement, food waste, among other possibilities) can pass through the openings 152 and accumulate on or within the tiles 102. Accordingly, such waste can be separated from the livestock on top of the upper portion 110 to improve hygiene of the livestock and general well-being of the livestock. In embodiments, the openings 152 can be dimensioned to prevent portions (e.g., feet) of the livestock from being caught therein. For example, the openings 152 can be dimensioned to be smaller than the feet of the livestock contained within the enclosure 101. In embodiments, the cover 150 can be spaced above the tiles 102 with a minimal vertical clearance (e.g., less than a thickness of the cover 150) between the cover 150 and the tiles 102, which can reduce heating requirements for livestock within the enclosure 101 while allowing for the tiles 102 to move unimpeded below the stationary cover 150.

In alternative embodiments, the tile cleaning system 100 can be provided without the cover 150 and livestock can freely reside directly on top of any tiles 102 within the enclosure. In such embodiments, the plurality of movers can move the tiles 102 around the circuit 154 between the plurality of movers while the livestock reside directly on top of the tiles 102.

The plurality of movers can move the tiles 102 under the enclosure 101 and to the cleaner 106 where each tile 102 can be cleaned, for example, one at a time. Each of the cleaner 106 and the plurality of movers can be disposed outside of the enclosure 101. That can be advantageous by limiting the potential for such structures to harm livestock within the enclosure 101 and/or for limiting interference with such structures by the livestock. The plurality of movers can move the tiles 102 around the circuit 154 at a relatively slow rate so as not to agitate livestock within the enclosure. For example, in embodiments the plurality of movers can move the tiles 102 around the circuit 154 at a rate of, for example, between 0.064-10.8 in/min, though other speeds outside this range are possible.

The tile cleaning system 100 can provide a number of advantages. For example, the tile cleaning system 100 can remove excreta deposited by the livestock on the tiles 102 and thereby improve sanitary conditions within the enclosure 101 for the livestock. Regular cleaning of the tiles 102 using the tile cleaning system 100 can improve moisture control and decrease the need for ventilation of the enclosure 101 or region that houses the livestock. The tile cleaning system 100 can utilize custom tiles 102 that can be adapted to serve the needs of different livestock or other applications. The tile cleaning system 100 can reduce down time of the enclosures 101 that hold livestock by allowing for continuous cleaning. The tile cleaning system 100 can improve harvesting. By providing tiles 102 that reside directly on the floor 104, the tile cleaning system 100 can reduce heating requirements within the enclosure 101 that holds the livestock as compared, for example, to suspended slatted floors. The tile cleaning system 100 can allow the tiles 102 to sit directly on the floor 104, which can allow the tiles 102 and the floor 104 to support heavy loads such as by machinery that can be associated with tending to the livestock. The tile cleaning system 100 can be a mechanically simple system with simple operation and easy maintenance. The tile cleaning system 100 can improve the lives of the livestock that reside on top of the tiles 102. The tile cleaning system 100 can collect livestock byproducts, for example at the cleaner 106, which can later be reused for other applications.

Figure 2:
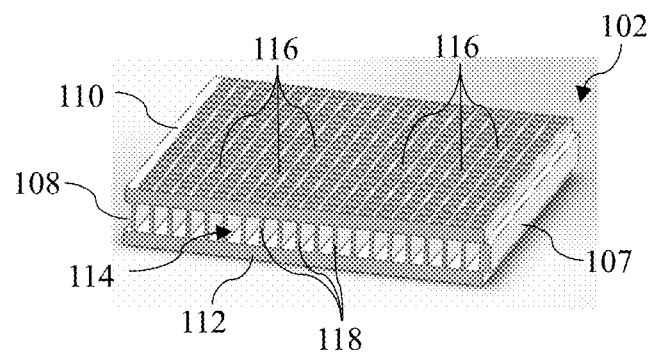
FIG. 2 shows an example tile.

FIG. 2 shows a perspective view of an example tile 102. In embodiments, the tiles 102 can interlock together. For example, the tiles 102 can include interlocking features such as for example a protrusion 107 and a recess 108 with a complementary size/shape to the size/shape of the protrusion 107. The interlocking features can interlock with respective interlocking features of adjacent tiles 102. In embodiments, the tiles 102 can interlock with respective adjacent tiles 102 within the same row. Additionally, or alternatively, in embodiments the tiles 102 can interlock with respective adjacent tiles 102 in adjacent rows.

The tile 102 can include an upper portion 110, a lower portion 112, and an accumulation area 114 defined in the space between the upper portion 110 and the lower portion 112. The upper portion 110 can define openings 116 that can extend entirely through the upper portion 110 and open into the accumulation area 114. In embodiments, the upper portion 110 can support livestock thereon, and waste associated with the livestock (e.g., excrement, food waste, among other possibilities) can pass through the openings 116 and accumulate within the accumulation area 114. Accordingly, such waste can be separated from the livestock on top of the upper portion 110 to improve hygiene of the livestock and general well-being of the livestock. In embodiments, the openings 116 can be dimensioned to prevent portions (e.g., feet) of the livestock from being caught therein. For example, the openings 116 can be dimensioned smaller than the feet of the livestock contained within the enclosure 101. In alternative embodiments, such as embodiments with the cover 150, the openings can be larger or can be a single opening to maximize the size of the pathway for waste to travel through the upper portion 110 and into the accumulation area 114. For example, the openings 116 can be dimensioned larger than the feet of livestock contained within the enclosure 101.

In embodiments, the tile 102 can include supports 118 that can support the upper portion 110 above the lower portion 112 in a spaced apart relationship. In embodiments, the lower portion 112 can include friction-reducing features on a bottom first surface opposite to the surface facing the accumulation area. The friction reducing features can include, for example, a coating, protrusions to reduce the surface area of the lower portion 112 that contacts the floor 104, bearings, wheels, among other possibilities. The friction reducing features can each be associated with a respective one of each of the tiles 102 and can be incorporated into the lower portion 112. The lower portion 112 can directly contact the floor 104 as the tile 102 moves along the circuit 154. For example, in embodiments in which the lower portion 112 does not include the friction reducing features, a lower surface of the lower portion 112 can directly contact the floor 104 as the tile 102 moves along the circuit 154. In embodiments in which the lower portion 112 includes the friction reducing features, the friction reducing features of each tile 102 can directly contact the floor 104 as the tile 102 moves along the circuit 154.

The plurality of movers can include any mechanical structure that can move the tiles 102. For example, the plurality of movers can include a motor (electric, internal combustion, among other possibilities) that powers a body that can push and/or pull the tiles 102 along the circuit 154. In embodiments, the plurality of movers can include a transmission to transmit energy from the motor to the body.

The plurality of movers can include a first mover 120 that can move a first row of the tiles 102 from a first end 156 of the circuit 154 towards a second end 158 of the circuit 154, at which the tiles 102 can be cleaned by the cleaner 106. For example, the first mover 120 can move the first row of the tiles 102 along the direction I, as shown in FIG. 1. The plurality of movers can include a second mover 122 that can move the tiles 102 from the first row of the tiles 102 to a second row of the tiles 102, which is adjacent to the first of row tiles 102. For example, the second mover 122 can move the tiles 102 along direction II shown in FIG. 1, which can be perpendicular to the direction I. The first mover 120 can be arranged at the first end 156 of the circuit 154, for example, outside of the enclosure 101 so as not to interfere with livestock within the enclosure 101. The second mover 122 can be arranged at the second end 158 of the circuit 154, for example, outside of the enclosure 101 so as not to interfere with livestock within the enclosure 101.

The plurality of movers can include a third mover 124 that can move the second row of the tiles 102 from the second end 158 of the circuit 154 towards the first end 156 of the circuit 154. For example, the third mover 124 can move the second row of tiles along the direction III, as shown in FIG. 1. The plurality of movers can include a fourth mover 126 that can move the tiles 102 from the second row of tiles 102 to the first row of tiles 102. For example, the fourth mover 126 can move the tiles 102 in a direction IV shown in FIG. 1, which can be perpendicular to the direction III. The third mover 124 can be arranged at the second end 158 of the circuit 154, for example, outside of the enclosure 101 so as not to interfere with livestock within the enclosure 101. The fourth mover 126 can be arranged at the first end 156 of the circuit 154, for example, outside of the enclosure 101 so as not to interfere with livestock within the enclosure 101.

In embodiments, the first mover 120 and the third mover 124 can move the tiles 102 at the same rate or at different rates. The second mover 122 and the fourth mover 126 can move the tiles 102 at the same rate or at different rates. The rate at which the first mover 120 and the third mover 124 move the tiles 102 can be relatively slow so as not to disturb livestock residing on top of the tiles 102 within the enclosure 101. For example, the first mover 120 and the third mover 124 can move the tiles 102 a rate of, for example, between 0.064-10.8 in/min, though other speeds are possible.

In embodiments, the second mover 122 and the fourth mover 126 can move the tiles 102 at a different rate than the rate at which the first mover 120 and the third mover 124 move the tiles 102. The rate that the second mover 122 and the fourth mover 126 move the tiles 102 can be faster than the rate at which the first mover 120 and the third mover 124 move the tiles 102. For example, after a tile 102 has been completely moved out of the enclosure 101 by the first mover 120 or the third mover 124, the second mover 122 or the fourth mover 126 can move the tile 102 quickly (relative to the rate at which the tiles 102 move in the row) into an open space in the adjacent row and clear room for the next tile 102 in the circuit 154 to be gradually moved out of the enclosure 101.

In embodiments, the first mover 120 and/or the third mover 124 can move the tiles 102 alternately with the second mover 122 and/or the fourth mover 126. That is, in embodiments, either the first mover 120 and the third mover 124 can simultaneously move the tiles 102 in the respective rows or the second mover 122 and the fourth mover 126 can simultaneously move the tiles 102 between rows. But, in embodiments, the first mover 120 and the third mover 124 do not move the tiles 102 in the respective rows while the second mover 122 and the fourth mover 126 move the tiles 102 between rows. In embodiments, the first mover 120 and/or the third mover 124 can stop while the second mover 122 and/or the fourth mover 126 move the tiles 102 into adjacent rows. In embodiments, the second mover 122 and/or the fourth mover 126 can stop while the first mover 120 and/or the third mover 124 move the tiles 102 in the respective rows.

In embodiments not shown, the plurality of movers can include only a single moving system provided at one location along the circuit 154. Together with a geometry of the tiles 102 or the circuit 154 itself, the single moving system can drive the tiles 102 along the circuit 154 by contacting the tiles 102 at only one end of the circuit 154.

The cleaner 106 can be any combination of mechanical or chemical components that can clean the tiles 102. For example, the cleaner 106 can include bodies that mechanically force waste off the tiles 102, fluid (e.g. water, soap, disinfectant, pressurized gas, etc.) baths or sprayers, among other possibilities.

Figure 3:
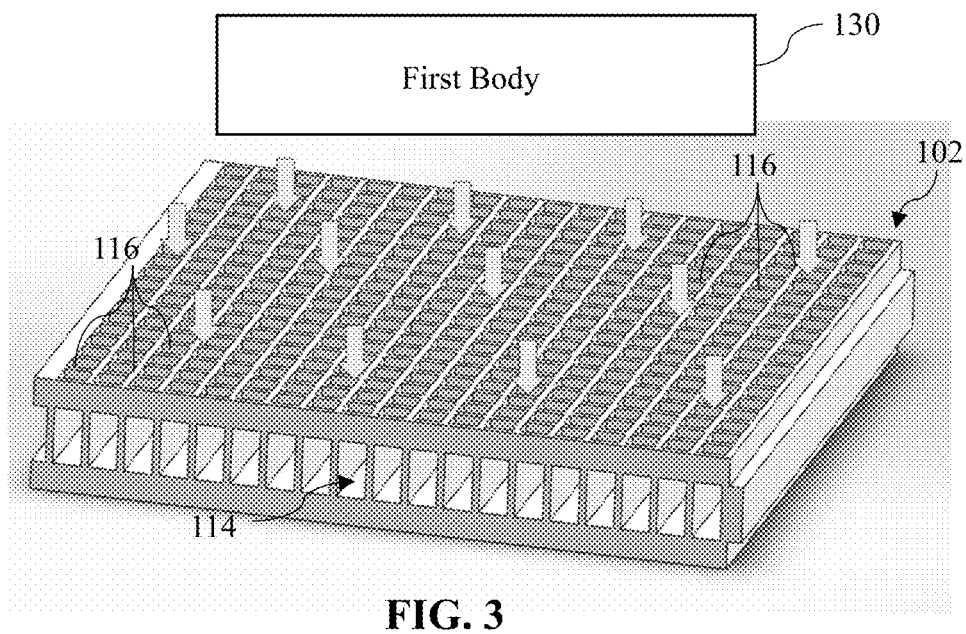
FIG. 3 shows the example tile and aspects of an example cleaner.
Figure 4:
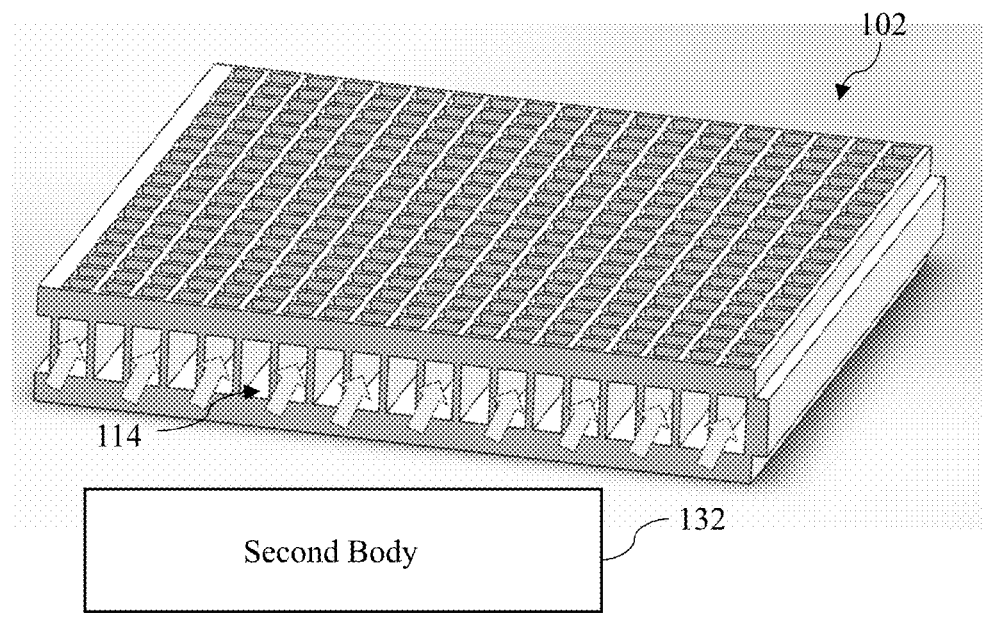
FIG. 4 shows the example tile and other aspects of the example cleaner.

FIGS. 3 and 4 show the tile 102 and aspects of an embodiment of the cleaner 106. In embodiments, the cleaner 106 can clean the tiles 102 with one or more bodies that correspond to a shape of the tile 102. For example, the cleaner 106 can include a first body 130 (shown schematically in FIG. 3) with a plurality of projections that correspond to (e.g., have the same size, shape, number, etc.) some or all of the openings 116 of the tile 102. The cleaner 106 can include a motor (e.g., electric, internal combustion, among other possibilities) that can move the first body 130 vertically into and out of the openings 116 of the tile 102 to force waste through the openings 116 and into the accumulation area 114. The cleaner 106 can include a second body 132 with a plurality of projections that correspond to (e.g., have the same size, shape, number, etc.) the accumulation area 114. The cleaner 106 can include a motor (e.g., electric, internal combustion, among other possibilities) that can move the second body 132 horizontally into and out of the accumulation area 114 to force waste out of the accumulation area 114 and thereby clean the tile 102. The cleaner 106 can operate sequentially. For example, the cleaner 106 can first force waste through the openings 116 into the accumulation area 114 with the first body 130 and can then force waste through the accumulation area 114 and out of the tile 102 with the second body 132.

Returning to FIG. 1, in embodiments the tile cleaning system 100 can include one or more containers 134. The containers 134 can contain/collect waste cleaned from the tile 102 with the cleaner 106, which can then be disposed of or used for the purposes.

In embodiments, the tile cleaning system 100 can include a device 136 that can move waste cleaned from the tiles 102 by the cleaner 106 to the containers 134. The device 136 can be a conveyor, scraper, or any other structure that can move waste to the containers 134. For example, the device 136 can include a trough 138 and a scraper 140. The scraper 140 can be operatively connected to a drive system 142 (e.g., a pulley with a motor) that can move the scraper 140 between the containers 134 to direct waste from the tiles 102 within the trough 138 to the containers 134.

Figure 5:
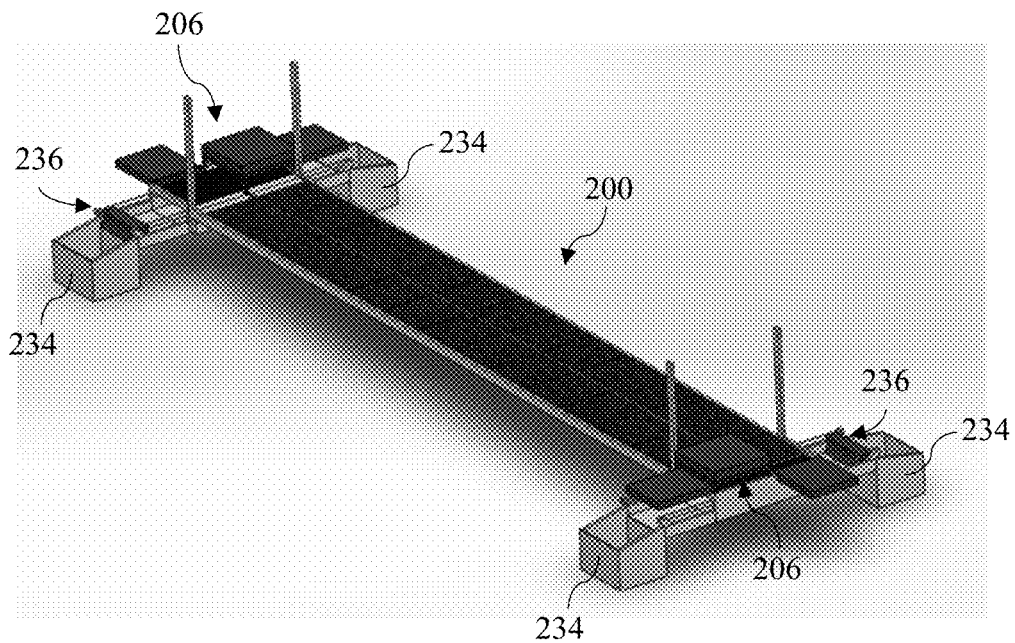
FIG. 5 shows another example tile cleaning system.

FIG. 5 shows another embodiment of the tile cleaning system 200. The tile cleaning system 200 can include each of the structures, features, and relationships described previously with respect to the tile cleaning system 100, and vice versa. In embodiments, the tile cleaning system 200 can include cleaners 206, containers 234, and/or devices 236 on each side of the circuit 154.

Figure 6:
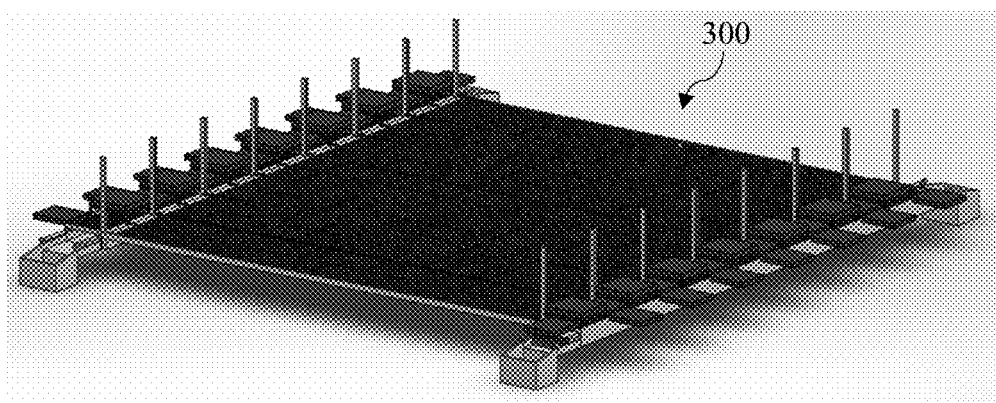
FIG. 6 shows yet another example tile cleaning system.

FIG. 6 shows another embodiment of the tile cleaning system 300. The tile cleaning system 300 can include each of the structures, features, and relationships described previously with respect to the tile cleaning systems 100, 200, and vice versa. In embodiments, the tile cleaning system 300 can be scaled up to include any number of adjacent tile cleaning systems to scale the system for a larger floor with multiple adjacent tile cleaning circuits running simultaneously.

Figure 7:
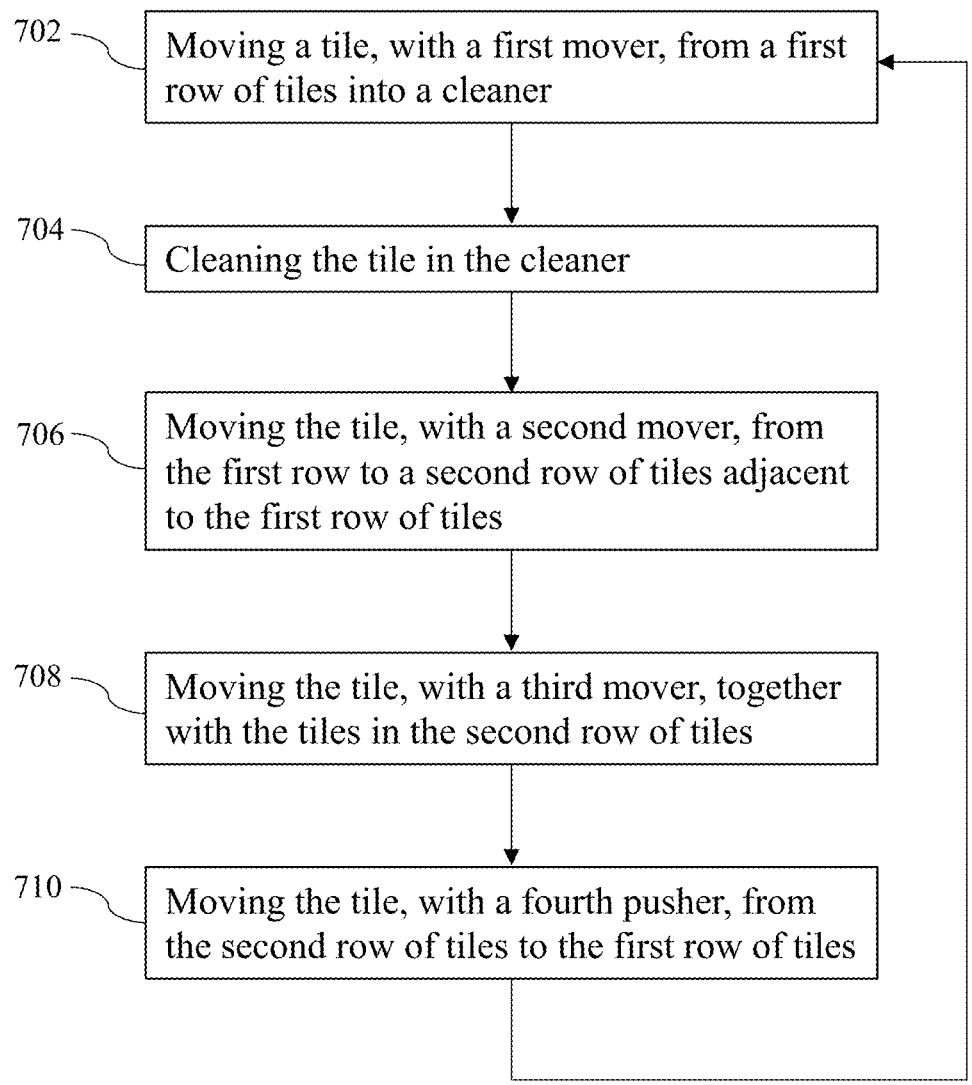
FIG. 7 shows an example process of cleaning tiles.

FIG. 7 shows a process 700 of cleaning the plurality of tiles 102 according to aspects of the invention. The process 700 can include, at step 702, moving the tiles 102 with the first mover 120 such that one of the tiles 102 from the first row of tiles 102 moves into the cleaner 106. For example, the first mover 120 can push an end of the first row of tiles 102 and the tile 102 at the end of the first row of tiles 102 farthest from the first mover 120 can be moved into the cleaner 106.

The process 700 can include, at step 704, cleaning the tile 102 within the cleaner 106 with the cleaner 106. Cleaning the tile 102 with the cleaner 106 can include cleaning the tile 102 vertically through the openings 116 of the tile 102 using, for example, the first body 130. Cleaning the tile 102 with cleaner 106 can include cleaning the tile 102 horizontally through the accumulation area 114 of the tile 102 using, for example, the second body 132. Additionally, or alternatively, cleaning with the cleaner 106 can include any of the other cleaning techniques capable of being performed by the cleaner 106, described previously. In embodiments, movement of the first row and/or the second row of tiles 102 by the first mover 120 and/or the third mover 124 can be paused or stopped while the tile 102 is cleaned within the cleaner 106. For example, movement of the first row and/or the second row of tiles 102 by the first mover 120 and/or the third mover 124 can be stopped for five minutes while the tile 102 is cleaned with the cleaner 106 and moved by the second mover 122, as described in 706 below. By stopping the first mover 120 and/or the third mover 124, sufficient space can be left to allow movement of the tile 102 from the first row of tiles 102 to the second row of tiles 102, and vice versa, as described in step 710 below.

The process 700 can include, at step 706, moving the tile 102, with the second mover 122, from the first row of tiles 102 to the second row tiles 102 adjacent to the first row of tiles 102. For example, the second mover 122 can directly move the tile 102 from the cleaner to the second row of tiles 102. As described above, the first mover 120 and/or the third mover 124 can be stopped during step 706.

The process 700 can include, at step 708, moving the tile 102 (now clean), with the third mover 124, together with the tiles 102 in the second row of tiles 102.

The process 700 can include, at step 710, moving the tile 102, with the fourth mover 126, from the second row of tiles 102 to the first row of tiles 102. The process 700 can repeat at step 702 after the tile 102 has returned to the cleaner 106 and thereby completed a full circuit around the tile cleaning system. The process 700 can run the tiles 102 around the cleaning circuit(s) continuously until interrupted by an operator or preprogrammed control.

The process 700 can be implemented with any of the tile cleaning systems 100, 200, 300 of this disclosure. Any of the tile cleaning systems 100, 200, 300 can include a controller or system of controllers (e.g., computers) that can implement the functionality described throughout this disclosure. For example, the controller or system of controllers can include, on non-transitory computer readable mediums, software that when executed cause the various structures controlled by the controller or system of controllers to perform the various functionalities described throughout this disclosure. The controller or system of controllers can be operatively connected to appropriate structures of the tile cleaning systems 100, 200, 300 of this disclosure.

It will be appreciated that the foregoing description provides examples of the invention. However, it is contemplated that other implementations of the invention may differ in detail from the foregoing examples. All references to the invention or examples thereof are intended to reference the particular example being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated.

What is claimed is:

1. A tile cleaning system comprising:
   a plurality of tiles, at least one tile of the plurality of tiles defining at least one region that is configured to collect livestock waste;
   a cleaner configured to clean the plurality of tiles, the cleaner comprising at least one body that is at least partially complimentary with the at least one region of the at least one tile,
   a plurality of movers that are configured to move the plurality of tiles along a floor, in a circuit and through the cleaner, while the plurality of tiles directly contact the floor; and
   wherein the at least one body of the cleaner, when the livestock waste is collected in the at least one region of the at least one tile, is configured to mechanically force the livestock waste out of the at least one region of the at least one tile.

2. The tile cleaning system of claim 1, further comprising an enclosure above the plurality of tiles.

3. The tile cleaning system of claim 2, further comprising a cover above the plurality of tiles and within a bottom of the enclosure.

4. The tile cleaning system of claim 3, wherein:
   the cover covers an entirety of a bottom area of the enclosure,
   the cover is configured to be stationary when the plurality of tiles moves along the floor in the circuit, and
   the cover comprises openings that extend entirely through the cover and open to the plurality of tiles below the cover.

5. The tile cleaning system of claim 1, wherein adjacent tiles of the plurality of tiles are configured to interlock together.

6. The tile cleaning system of claim 1, wherein the plurality of movers comprise:
   a first mover configured to move a first row of tiles of the plurality of tiles towards a second end of the circuit; and
   a second mover configured to move the plurality of tiles from the first row of tiles to a second row of tiles of the plurality of tiles.

7. The tile cleaning system of claim 6, wherein the second mover is configured to move the plurality of tiles at a rate that is faster than a rate that the first mover is configured to move the plurality of tiles.

8. The tile cleaning system of claim 6, wherein the first mover is configured to move the plurality of tiles alternately with the second mover.

9. The tile cleaning system of claim 6, wherein the plurality of movers comprises:
   a third mover configured to move the second row of tiles towards a first end of the circuit; and
   a fourth mover configured to move the plurality of tiles from the second row of tiles to the first row of tiles.

10. The tile cleaning system of claim 9, wherein the fourth mover is configured to move the plurality of tiles at a rate that is faster than a rate that the third mover is configured to move the plurality of tiles.

11. The tile cleaning system of claim 9, wherein the third mover is configured to move the plurality of tiles alternately with the fourth mover.

12. The tile cleaning system of claim 9, wherein at least one of the first mover and the third mover are configured to move the plurality of tiles at a rate of between 0.064-10.8 in/min.

13. The tile cleaning system of claim 9, wherein the first mover and the third mover are configured to move the plurality of tiles at a same rate.

14. The tile cleaning system of claim 1, wherein:
   the at least one tile comprises:
      an upper portion;
      a lower portion; and
      an accumulation area defined in a space between the upper portion and the lower portion,
   the upper portion defines openings that extend entirely through the upper portion and open into the accumulation area,
   the at least one region comprises the accumulation area and the openings,
   the at least one body comprises a first body and a second body,
   the first body corresponds to the openings of the upper portion of the at least one tile,
   the second body corresponds to the accumulation area, and
   the first body and the second body are respectively configured to force livestock waste through the openings and through the accumulation area and out of the at least one tile to clean the at least one tile.

15. A tile cleaning system comprising:
   a plurality of tiles, each tile of the plurality of tiles comprising:
      an upper portion that defines openings extending entirely therethrough;
      a lower portion; and
      an accumulation area defined in a space between the upper portion and the lower portion;
   a cleaner comprising a first body; and
   a plurality of movers that are configured to move the plurality of tiles along a floor, in a circuit and through the cleaner, while the plurality of tiles directly contact the floor, wherein:

the openings extend entirely through the upper portion and open into the accumulation area, the first body corresponds to the openings of the upper portion of each of the plurality of tiles, and the first body is configured to force waste through the openings of the upper portion of each of the plurality of tiles.

16. The tile cleaning system of claim 15, wherein:

the cleaner further comprises a second body that corresponds to the accumulation area of each of the plurality of tiles, and the second body is configured to force waste through the accumulation area and out of each of the plurality of tiles to clean each of the plurality of tiles.

17. A method of cleaning a plurality of tiles, the method comprising:

moving at least one tile of a plurality of tiles, with a first mover, from a first row of the plurality of tiles into a cleaner;

cleaning the at least one tile in the cleaner, the cleaning comprising mechanically forcing livestock waste out of at least one region of the at least one tile with at least one body of the cleaner;

moving the at least one tile, with a second mover, from the first row to a second row of the plurality of tiles adjacent to the first row; and moving the at least one tile, with a third mover, in the second row.

18. The method of claim 17, wherein cleaning the at least one tile with the cleaner comprises cleaning the at least one tile vertically through openings in an upper portion of the at least one tile.

19. The method of claim 17, wherein cleaning the at least one tile with the cleaner comprises cleaning the at least one tile horizontally through an accumulation area of the at least one tile.

20. The method of claim 17, further comprising moving the at least one tile, with a fourth pusher, from the second row to the first row.

\* \* \* \* \*